US012088997B2

(12) United States Patent
Xu et al.

(10) Patent No.: US 12,088,997 B2
(45) Date of Patent: Sep. 10, 2024

(54) ACOUSTIC DEVICE AND ELECTRONIC EQUIPMENT

(71) Applicant: GOERTEK INC., Shandong (CN)

(72) Inventors: Tongyan Xu, Shandong (CN); Xiang Guo, Shandong (CN)

(73) Assignee: GOERTEK INC., Weifang (CN)

(*) Notice: Subject to any disclaimer, the term of this patent is extended or adjusted under 35 U.S.C. 154(b) by 60 days.

(21) Appl. No.: 17/622,937

(22) PCT Filed: Dec. 24, 2019

(86) PCT No.: PCT/CN2019/127843
§ 371 (c)(1),
(2) Date: Dec. 27, 2021

(87) PCT Pub. No.: WO2020/258786
PCT Pub. Date: Dec. 30, 2020

(65) Prior Publication Data

US 2022/0248127 A1 Aug. 4, 2022

(30) Foreign Application Priority Data

Jun. 27, 2019 (CN) ........................ 201920987590.X

(51) Int. Cl.
*H04R 1/28* (2006.01)
*H04R 1/02* (2006.01)
(Continued)

(52) U.S. Cl.
CPC ........... *H04R 1/2826* (2013.01); *H04R 1/025* (2013.01); *H04R 7/12* (2013.01); *H04R 9/06* (2013.01)

(58) Field of Classification Search
CPC ...... H04R 1/2834; H04R 1/025; H04R 1/283; H04R 1/2807; H04R 1/2811;
(Continued)

(56) References Cited

U.S. PATENT DOCUMENTS 5,475,764 A 12/1995 Polk
2006/0291684 A1 12/2006 Chick et al.
(Continued)

FOREIGN PATENT DOCUMENTS

AT 281748 T 11/2004
CA 2198116 A1 2/1996
(Continued)

OTHER PUBLICATIONS

International Search Report from International Application No. PCT/CN2019/127843 mailed Mar. 26, 2020.

*Primary Examiner* — Ahmad F. Matar
*Assistant Examiner* — Sabrina Diaz
(74) *Attorney, Agent, or Firm* — Shih IP Law Group, PLLC

(57) ABSTRACT

Disclosed by the present invention is an acoustic device, comprising a sound generating unit. A first sealed cavity is formed at the rear side of a vibrating diaphragm of the sound generating unit, a mounting hole is provided on a cavity wall of the first sealed cavity, and a flexible deformation part is provided on the mounting hole. A second sealed cavity is formed at the outer side of the first sealed cavity, and the second sealed cavity encloses the sound wave generated during deformation of the flexible deformation part therein. The mounting hole is located on the first wall, and a groove is provided on the first wall at the periphery of the mounting hole towards the first sealed cavity. The flexible deformation part is fixed on the bottom of the groove, and a through groove is further provided on the first wall.

9 Claims, 6 Drawing Sheets

(51) Int. Cl.
*H04R 7/12* (2006.01)
*H04R 9/06* (2006.01)

(58) Field of Classification Search
CPC .. H04R 1/2815; H04R 1/2819; H04R 1/2826; H04R 7/14; H04R 7/20; H04R 7/12; H04R 9/06
USPC .................................................. 381/335, 186
See application file for complete search history.

(56) References Cited

U.S. PATENT DOCUMENTS

| | | | | | |
|---|---|---|---|---|---|
| 2007/0127760 | A1 | 6/2007 | Saiki et al. | | |
| 2015/0195636 | A1* | 7/2015 | Pan | H04R 1/02 | 181/199 |
| 2015/0304760 | A1* | 10/2015 | Yeh | H04R 1/1058 | 381/370 |
| 2018/0035198 | A1 | 2/2018 | Zhong et al. | | |

FOREIGN PATENT DOCUMENTS

| | | | | | |
|---|---|---|---|---|---|
| CN | 1158688 | A | | 9/1997 | |
| CN | 202652453 | U | * | 1/2013 | H04R 1/02 |
| CN | 104754454 | A | | 7/2015 | |
| CN | 205622754 | U | * | 10/2016 | H04N 5/60 |
| CN | 109218939 | A | | 1/2019 | |
| CN | 109803215 | A | | 5/2019 | |
| CN | 109874094 | A | | 6/2019 | |
| CN | 110446139 | A | | 11/2019 | |
| DE | 69533717 | | | 12/2004 | |
| EP | 0776590 | A1 | | 6/1997 | |
| WO | 9606513 | A1 | | 2/1996 | |
| WO | 2016150216 | A1 | | 9/2016 | |

* cited by examiner

Prior Art

ACOUSTIC DEVICE AND ELECTRONIC EQUIPMENT

TECHNICAL FIELD

The present invention relates to the acoustic technical field, specifically, to an acoustic device and an electronic apparatus in which the acoustic device is mounted.

BACKGROUND ART

In general, an acoustic system with a traditional structure (prior art 1) comprises a closed housing and a sound generating unit provided on the closed housing, and a cavity is formed between the closed housing and the sound generating unit. Due to the volume limitation of the cavity in the acoustic system, it is difficult for the acoustic system, especially the small acoustic system, to achieve the effect of satisfactorily reproducing the bass. Conventionally, in order to achieve satisfactory bass reproduction in the acoustic system, two methods are often used, one of them is to provide a sound-absorbing material (such as activated carbon, zeolite, etc.) in the housing of the acoustic system to adsorb or desorb the gas in the housing, so as to increase the volume and thereby reduce the low-frequency resonance frequency; the other one is to provide a passive radiator on the housing of the acoustic system (prior art 2), for example, as shown in FIG. 1, wherein 10 is the sound generating unit, 20 is the housing of the acoustic system, 30 is the passive radiator, the sound generating unit and the passive radiator radiate sound to outside at the same time, and the sound waves of the sound generating unit and the passive radiator are communicated and superimposed based on the principle that the passive radiator and the housing form strong resonance at a specific frequency point fp (resonant frequency point), so as to enhance the local sensitivity near the resonant frequency point fp (for example, see patent CN1939086A). However, the above two methods have problems, the first method of adding the sound-absorbing material in the housing needs to realize good sealing and packaging of the sound-absorbing material, otherwise if the sound-absorbing material enters the speaker unit, it will damage the acoustic performance of the speaker unit and affect the usage lifespan of the speaker unit; in the second method of adopting passive radiator, near the resonance frequency point fp, the passive radiator radiates strongly and the sound generating unit almost stops, therefore, the local sensitivity enhancement of the acoustic system can be realized in the frequency band near fp through the high sensitivity design of the passive radiator, however, in the frequency band below fp, the phase of the sound wave of the passive radiator is opposite to the phase of the sound wave of the sound generating unit, and the sound waves offset with each other, and thus the passive radiator has a negative effect on the sensitivity of the acoustic system. In short, the passive radiator can only improve the sensitivity of the frequency band near the resonance point, but cannot improve all the low frequency bands. As shown in FIG. 2, FIG. 2 shows the test curves of loudness (SPL curves) at different frequencies for the prior art 2 and the prior art 1. Therefore, it is necessary to further improve the defects of the prior art.

SUMMARY

An object of the present invention is to provide an acoustic device which can effectively reduce the resonant frequency and greatly improve the low-frequency sensitivity of the product as a whole.

In order to solve the above technical problems, the technical solution provided by the present invention is an acoustic device, comprising:

a sound generating unit comprising a vibrating diaphragm, wherein the acoustic device is provided with a sound outlet, and a sound wave at a front side of the vibrating diaphragm radiates to outside through the sound outlet, wherein a first sealed cavity is formed at a rear side of the vibrating diaphragm, a cavity wall of the first sealed cavity is provided with a mounting hole, a flexible deformation part is provided at the mounting hole, a second sealed cavity is provided at an outer side the first sealed cavity, the flexible deformation part is located between the first sealed cavity and the second sealed cavity, and the second sealed cavity encloses a sound wave, which is generated by the flexible deformation part during deformation, in the second sealed cavity, and the cavity wall comprises a first wall and a second wall connected with the first wall, the mounting hole is located at the first wall, a groove formed by recessing towards the first sealed cavity is provided at the first wall around the mounting hole, the flexible deformation part is fixed at a groove bottom of the groove, a through groove formed by recessing towards the first sealed cavity is further provided at the first wall, and the through groove passes through the groove and an outer surface of the second wall.

Preferably, the flexible deformation part comprises a body part, and the body part has a flat plate structure; or at least an edge portion of the body part is provided with a protrusion; or at least the edge portion of the body part has a wavy structure.

Preferably, the edge portion of the body part is provided with one protrusion, and the protrusion protrudes from the first sealed cavity towards the second sealed cavity; alternatively, the protrusion protrudes from the second sealed cavity towards the first sealed cavity.

Preferably, the flexible deformation part further comprises a composite sheet combined with the body part at a central position of the body part, and the body part has a sheet-like overall structure or the central position of the body part is hollowed out.

Preferably, the body part of the flexible deformation part has a single-layer structure, and the single-layer structure is made of one of polymer plastic, thermoplastic elastomer and silicone rubber.

Alternatively, the body part of the flexible deformation part has a multi-layer structure, and at least one layer in the multi-layer structure is made of one of polymer plastic, thermoplastic elastomer and silicone rubber.

Preferably, a volume of the second sealed cavity is greater than a volume of the first sealed cavity, and at least a portion of a housing of an electronic apparatus for mounting the acoustic device is used to form the first sealed cavity and/or the second sealed cavity.

Preferably, the acoustic device comprises a first housing, the sound generating unit is mounted on the first housing to form a sound generating assembly, the first sealed cavity is formed between the vibrating diaphragm of the sound generating unit and the first housing, the first housing is provided with the mounting hole thereon, and the flexible deformation part is provided at the mounting hole.

The acoustic device comprises a second housing, the sound generating assembly is mounted in the second housing, the second sealed cavity is formed between the second housing and the first housing, and the second housing is the housing of the electronic apparatus.

Preferably, the first housing comprises a top wall, a bottom wall and a side wall connected between the top wall and the bottom wall, wherein the top wall or the bottom wall is the first wall, and the side wall is the second wall.

Preferably, the first housing is provided with a plurality of mounting holes, and each of the mounting holes is provided with a flexible deformation part thereon.

Another object of the present invention is to provide an electronic apparatus, which comprises the housing of the electronic apparatus and the above-described acoustic device. The acoustic device can effectively reduce the resonant frequency and greatly improve the low-frequency sensitivity of the product as a whole.

In the technical solution provided by the present invention, the first sealed cavity is formed at the rear side of the vibrating diaphragm in the acoustic device, the flexible deformation part is covered and provided on the mounting hole of the cavity wall of the first sealed cavity, and the second sealed cavity for enclosing the sound wave generated by the flexible deformation part during deformation is further provided at the outer side of the first sealed cavity. By providing the flexible deformation part, the flexible deformation part deforms with the sound pressure, and the volume of the first sealed cavity is adjustable, so that the equivalent acoustic compliance of the first sealed cavity increases, the resonance frequency of the acoustic device is effectively reduced, and the low-frequency sensitivity is improved. Through the isolation design of the sound generating unit and the flexible deformation part, the radiated sound wave of the flexible deformation part is enclosed in the acoustic device, to avoid the offset effect on the forward radiated sound wave of the sound generating unit due to the anti-phase radiated sound wave of the flexible deformation part, and thus the low-frequency sensitivity of the product is greatly improved as a whole.

Further, during assembly, the side of the flexible deformation part facing the second sealed cavity is easy to be blocked by other components located in the second sealed cavity, resulting in the reduction or failure of the improvement amplitude of the low-frequency sensitivity. Therefore, in the present invention, the groove formed by recessing towards the first sealed cavity is provided at the first wall around the mounting hole, the flexible deformation part is fixed at the groove bottom of the groove, the through groove formed by recessing towards the first sealed cavity is further provided at the first wall, and the through groove passes through the groove and the outer surface of the second wall. According to the above design, the sound wave generated by the vibration of the flexible deformation part can be transmitted to the second sealed cavity through the through groove, so that the failure of the flexible deformation part is avoided.

Through the following detailed description of the exemplary embodiments of the present invention with reference to the accompanying drawings, other features and advantages of the present invention will become clear.

BRIEF DESCRIPTION OF THE DRAWINGS

The accompanying drawings incorporated into and constituting a part of the specification show embodiments of the present invention and are used to explain the principle of the present invention together with its description.

DESCRIPTION OF THE REFERENCE NUMERALS

Figure 1:
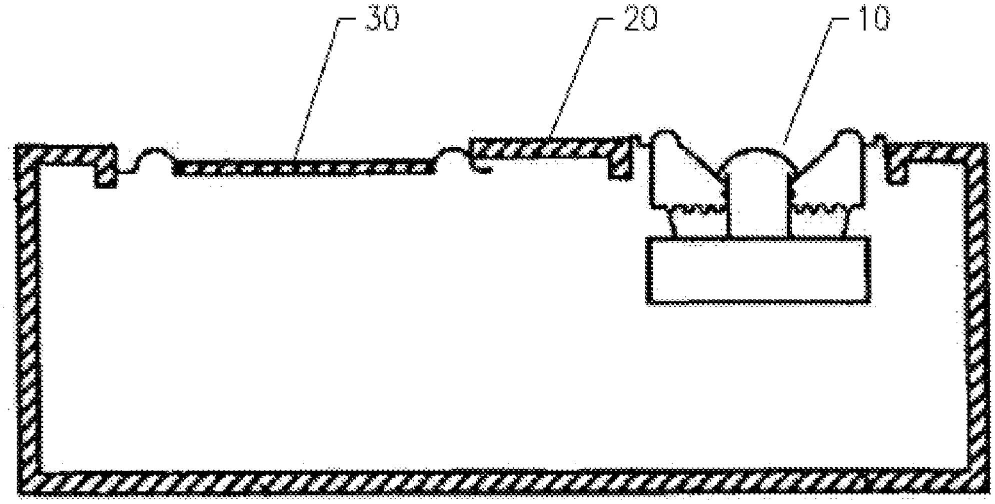
FIG. 1 is a schematic diagram of the structure of the acoustic device provided with a passive radiator in the prior art 2.

1: sound generating unit; 11: vibrating diaphragm; 2: first housing; 21: first sealed cavity; 22: flexible deformation part; 221: body part; 222: protrusion; 223: composite sheet; 23: pressure equalizing hole; 24: groove; 25: through groove; 261: first wall; 262: second wall; 3: second housing; 31: second sealed cavity; 4: sound outlet; 5: electronic apparatus.

DETAILED DESCRIPTION OF EMBODIMENTS

Various exemplary embodiments of the present invention will now be described in detail with reference to the accompanying drawings. It should be noted that the relative arrangement, numerical expressions and values of the parts and steps described in these embodiments do not limit the scope of the present invention unless otherwise specified.

The following description of at least one exemplary embodiment is actually only illustrative and in no way serves as any limitation on the present invention and its application or use.

The technologies, methods and devices known to those skilled in the art may not be discussed in detail, but in appropriate circumstance, the technologies, methods and devices shall be regarded as a part of the specification.

In all of the examples shown and discussed here, any specific value should be interpreted as merely exemplary and not as a limitation. Therefore, other examples of exemplary embodiments may have different values.

It should be noted that similar reference numerals represent similar items in the following drawings. Therefore, once an item is defined in a drawing, it does not need to be further discussed in subsequent drawings.

Embodiment 1

Figure 3A:
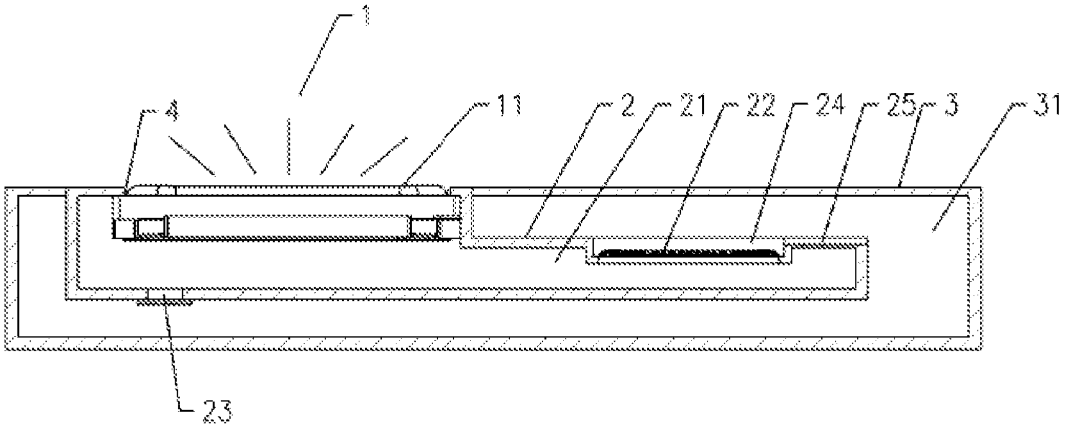
FIG. 3A is a schematic diagram of the structure of the acoustic device according to an embodiment of the present invention.

As shown in FIG. 3A, an acoustic device comprises a sound generating unit 1. In this embodiment, the sound generating unit 1 is a micro sound generating unit, and more specifically, the sound generating unit 1 is a micro moving coil speaker. The sound generating unit 1 generally comprises a housing, and a vibrating system and a magnetic circuit system accommodated and fixed in the housing. The vibrating system comprises a vibrating diaphragm 11 fixed on the housing and a voice coil combined with the vibrating diaphragm 11. A magnetic gap is formed in the magnetic circuit system. The voice coil is provided in the magnetic gap. After alternating current is supplied to the voice coil, the voice coil moves up and down in the magnetic field, thus driving the vibrating diaphragm 11 to vibrate and generate sound.

The acoustic device is provided with a sound outlet 4, the sound wave at the front side of the vibrating diaphragm 11 radiates to the outside through the sound outlet 4, and the sound wave at the rear side of the vibrating diaphragm 11 is retained in the acoustic device. A cavity is formed between the vibrating diaphragm 11, the housing and the magnetic circuit system. Generally, a rear sound hole is provided on the housing or the magnetic circuit system or between the housing and the magnetic circuit system, and the sound wave at the rear side of the vibrating diaphragm 11 will enter the interior of the acoustic device through the rear sound hole. In this embodiment, the vibration direction of the vibrating diaphragm 11 of the sound generating unit 1 is parallel to the thickness direction of the acoustic device, which is beneficial to the thin design of the acoustic device.

Further, in this embodiment, a closed first sealed cavity 21 is formed at the rear side of the vibrating diaphragm 11, the cavity wall of the first sealed cavity 21 is provided with a mounting hole, a flexible deformation part 22 is provided at the mounting hole, a second sealed cavity 31 is provided at the outer side of the first sealed cavity 21, and the flexible deformation part 22 is located between the first sealed cavity 21 and the second sealed cavity 31.

When the vibrating diaphragm 11 vibrates, the internal sound pressure of the first sealed cavity 21 changes, and the flexible deformation part 22 deforms as the sound pressure in the first sealed cavity 21 changes, so as to flexibly adjust the volume of the first sealed cavity; and the second sealed cavity 31 encloses the sound wave generated by the flexible deformation part 22 during deformation in the second sealed cavity 31.

In this embodiment, at least a part of the housing of the electronic apparatus for mounting the acoustic device is used to form the first sealed cavity 21 and/or the second sealed cavity 31. Wherein, the electronic apparatus 5 may be a mobile phone, a tablet computer, a notebook computer, etc. That is, part or entire of the cavity walls of the first sealed cavity 21 are composed of the housing of the electronic apparatus, or part or entire of the cavity walls of the second sealed cavity 31 are composed of the housing of the electronic apparatus, or part or entire of the cavity walls of the first sealed cavity 21 and the second sealed cavity 31 are composed of the housing of the electronic apparatus. In the present invention, the housing of the electronic apparatus is also used as the cavity wall of the first sealed cavity and/or the second sealed cavity, which can make full use of the internal space of the electronic apparatus, and meanwhile save a part of the space occupied by the cavity wall, and is more beneficial to the thin design of the electronic apparatus.

It should be noted that the term "closed" or "sealed" described in this embodiment and the present invention may be a completely closed or sealed state or a relatively closed or sealed state in physical structure. For example, according to the use requirements for the product, the first sealed cavity may comprise a pressure equalizing hole 23 provided to balance the internal and external air pressure and have no significant impact on the rapid change of the sound pressure, or other opening structures, and this first sealed cavity is also considered as a sealed cavity. For another example, the second sealed cavity may comprise a gap and the like generated when combined with the first sealed cavity, a gap of its own structure, etc. They can effectively isolate the sound wave generated by the flexible deformation part and have no obvious impact on the sound wave generated by the sound generating unit, therefore, they are also considered as sealed cavities. Generally, the total area of the above opening or gap shall not exceed 20 $mm^2$.

Further, the cavity wall of the first sealed cavity 2121 comprises a first wall 261 and a second wall 262 connected with the first wall 261, the mounting hole is located at the first wall 261, a groove 24 formed by recessing towards the first sealed cavity 21 is provided at the first wall 261 around the mounting hole, and the flexible deformation part 22 is fixed at the groove bottom of the groove 24. According to the above design, the flexible deformation part does not occupy the volume of the second sealed cavity 31.

The first wall 261 is further provided with a through groove 25 formed by recessing towards the first sealed cavity 21, and the through groove 25 passes through the groove 24 and the outer surface of the second wall 262. According to the above design, the sound wave generated by the vibration of the flexible deformation part 22 may be transmitted to the second sealed cavity 31 through the through groove 25, which can avoid the problem that the improvement amplitude of the low-frequency sensitivity is reduced or invalid caused by the phenomenon that the side of the flexible deformation part 22 facing the second sealed cavity 31 is blocked by other components in the second sealed cavity 31 during assembly.

As a specific embodiment, the acoustic device comprises a first housing 2, the sound generating unit 1 is mounted on the first housing 2 to form a sound generating assembly, the first sealed cavity 21 is formed between the vibrating diaphragm 11 of the sound generating unit 1 and the first housing 2, the mounting hole is provided on the first housing 2, the flexible deformation part 22 is provided at the mounting hole, the number of mounting holes and flexible deformation parts 22 are not limited to one group, and a plurality of groups of mounting holes and flexible deformation parts may be provided at different positions of the first housing 2. The acoustic device comprises a second housing 3, the sound generating assembly is mounted in the second housing 3, and the second sealed cavity 31 is formed between the second housing 3 and the first housing 1. Wherein, in the case that there are other components in the second housing 3, the second sealed cavity 31 is actually composed of a gap between the other components, the second housing 3 and the first housing 2.

In this embodiment, the sound generating unit 1 is provided inside the first housing 2, and the sound generating unit 1 and the first housing 2 form an integral structure, this integral structure is then assembled with the second housing 3. The first housing 2 is provided with an opening, the front space of the diaphragm is communicated with the opening, and the sound radiates to the sound outlet 4 of the acoustic device through the opening.

Figure 8:
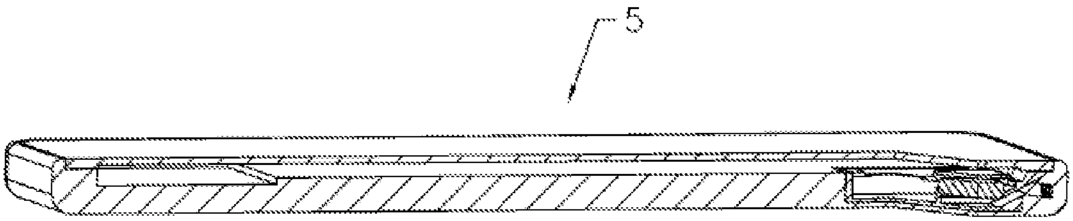
FIG. 8 is a schematic diagram of the structure of the electronic apparatus using the acoustic device in accordance with the present invention.
Figure 9:
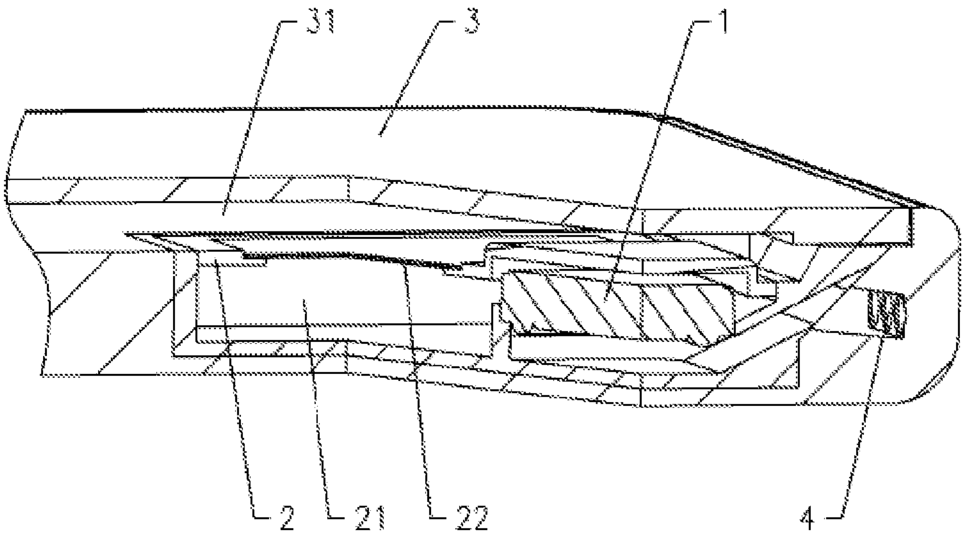
FIG. 9 is a partial enlarged view of FIG. 8.

In this embodiment, further combined with the structural diagrams of the electronic apparatus shown in FIG. 8 and FIG. 9, the acoustic device is mounted in the electronic apparatus such as a mobile phone, and the housing of the electronic apparatus also serves as the second housing 3 of the acoustic device. The space between the housing of the electronic apparatus and the internal components as well as the space between the housing of the electronic apparatus and the first housing 2 of the acoustic device form the second sealed cavity 31, so that the second housing of the acoustic device itself is omitted, and the gap space between the housing of the electronic apparatus and the components is fully utilized, therefore, the maximum design of the second sealed cavity 31 can be realized.

Figure 4:
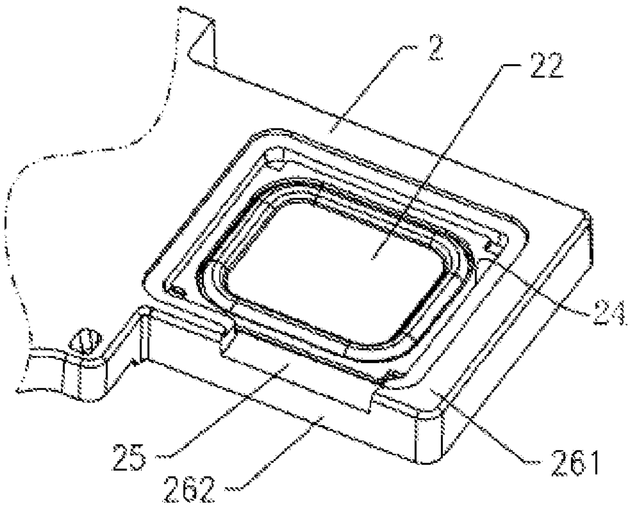
FIG. 4 is a schematic diagram of the stereoscopic structure of the first housing and the flexible deformation part in FIG. 3A.

As shown in FIG. 4, in one specific embodiment, the first housing 2 comprises a top wall, a bottom wall and a side wall connected between the top wall and the bottom wall, wherein the top wall or the bottom wall is the first wall 261, and the side wall is the second wall 262. In this specific embodiment, the top wall is the first wall 261, the mounting hole is located at the top wall, a groove 24 formed by recessing towards the first sealed cavity 21 is provided at the top wall around the mounting hole, the flexible deformation part 22 is fixed at the groove bottom of the groove 24, a through groove 25 formed by recessing towards the first sealed cavity 21 is further provided at the top wall, the through groove 25 passes through the groove 24 and the outer surface of the side wall. In other embodiments, the side wall may be the first wall, the top wall or the bottom wall may be the second wall, the mounting hole, the groove and the through groove are provided at the side wall, and the through groove passes through the groove and the outer surface of the top wall/bottom wall.

In the state that the acoustic device is in operation, when the vibrating diaphragm 11 vibrates downward to compress the volume at the rear side of the vibrating diaphragm 11, the sound pressure will be transmitted to the flexible deformation part 22 through the first sealed cavity 21, and the flexible deformation part 22 will expand and deform towards the outer side of the first sealed cavity 21; on the contrary, when the diaphragm vibrates upward, the flexible deformation part 22 will shrink and deform inward, to adjust the volume of the first sealed cavity 21 so as to increase the equivalent acoustic compliance of the first sealed cavity 21, effectively reduce the resonance frequency of the acoustic device and improve the low-frequency sensitivity. Through the isolation design of the sound generating unit 1 and the flexible deformation part 22, the radiated sound wave of the flexible deformation part 22 is enclosed in the acoustic device, to avoid the offset effect on the forward radiated sound wave of the sound generating unit 1 due to the anti-phase radiated sound wave of the flexible deformation part 22, and thus the low-frequency sensitivity of the product is greatly improved as a whole.

Specifically, the flexible deformation part 22 comprises a body part 221, and the body part 221 may have a single-layer structure made of one of polymer plastic, thermoplastic elastomer and silicone rubber, alternatively, the body part 221 may have a multi-layer structure, and at least one layer in the multi-layer structure is made of one of polymer plastic, thermoplastic elastomer and silicone rubber.

Figure 3B:
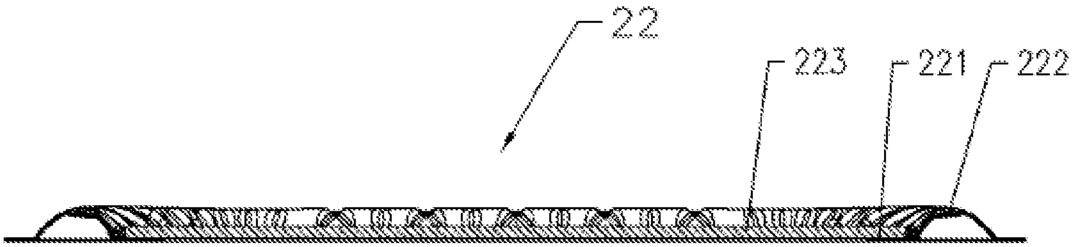
FIG. 3B is an enlarged schematic diagram of the structure of the flexible deformation part in FIG. 3A.

The body part 221 may have a flat plate structure, which is beneficial to reducing the height of the flexible deformation part 22 and reducing the space occupied by the flexible deformation part 22. The body part 221 may also have a partially convex or concave structure, for example, a structure with a convex center portion, a convex edge portion, or a combination of a convex center portion and a convex edge portion; alternatively, at least the edge portion of the body part 221 has a wavy structure. In one specific embodiment, as shown in FIG. 3B, the edge portion of the body part 221 is provided with a protrusion 222, and the protrusion 222 protrudes from the first sealed cavity 21 towards the second sealed cavity 31; alternatively, the protrusion 222 protrudes from the second sealed cavity 31 towards the first sealed cavity 21. The protrusion structure can provide greater elastic deformation, increase the vibration displacement of the flexible deformation part 22, and improve the volume adjustment effect on the first sealed cavity 21. Further, in order to improve the vibration effect, a composite sheet 223 may be superimposed at the central position of the body part 221 of the flexible deformation part 22, the strength of the composite sheet 223 is higher than that of the body part 221, and the composite sheet 223 may be consists of metal, plastic, carbon fiber or may be a composite structure thereof, etc. In addition, the body part 221 of the flexible deformation part 22 may have a sheet-like overall structure, or the central position of the body part 221 may be hollowed out, and the portion hollowed out is enclosed through the composite sheet 223. In the case that the center hollowed-out structure of the body part 221 of the flexible deformation part 22 only retains the edge portion, the edge portion may have a flat plate shape, a shape convex towards one side, or a wavy shape.

As a specific embodiment, the flexible deformation part 22 may be integrated with other parts of the first housing 2. The flexible deformation part 22 may be manufactured first, and then the flexible deformation part 22 may be integrally injected and molded as an insert member into the other parts of the housing. Alternatively, the flexible deformation part 22 is fixedly connected with the portion of the first housing around the mounting hole by bonding, welding or hot melting.

In this embodiment, the main body of the first sealed cavity 21 and the main body of the second sealed cavity 31 extend along a horizontal direction defined by the length and width of the acoustic device, and the horizontal direction may also be defined as a direction perpendicular to the thickness direction of the acoustic device. The horizontal direction generally refers to the direction parallel to a horizontal plane when the acoustic device is placed on the horizontal plane, and the two cavities are provided along the horizontal direction, such that not occupy the space in the height direction of the acoustic device as much as possible, which is beneficial to the thin design of the product.

The second housing 3 has a top wall, a bottom wall and a side wall connecting the top wall and the bottom wall, and the sound outlet 4 of the acoustic device is provided at the top wall, the bottom wall or the side wall of the second housing. As shown in FIG. 3, in this embodiment, the sound outlet 4 is provided at the top wall of the second housing, and the pressure equalizing hole 23 is provided on the first sealed cavity 21.

In the technical solution of this embodiment, in the acoustic device, by providing the flexible deformation part 22, the flexible deformation part 22 deforms with the sound pressure, and the volume of the first sealed cavity 21 is adjustable, to increase the equivalent acoustic compliance of the first sealed cavity 21, effectively reduce the resonance frequency of the acoustic device, and improve the low-frequency sensitivity; and the sound radiation generated by the flexible deformation part 22 during the deformation is isolated by the second sealed cavity 31, and the radiated sound wave of the flexible deformation part 22 is enclosed in the acoustic device, so as to avoid the offset effect on the forward radiated sound wave of the sound generating unit 1 due to the anti-phase radiated sound wave of the flexible deformation part 22, and thus the low-frequency sensitivity of the product is greatly improved as a whole.

Moreover, in this embodiment, the volume of the second sealed cavity 31 is greater than that of the first sealed cavity 21, which can make the deformation of the flexible deformation part 22 easier, and is more beneficial to increasing the equivalent acoustic compliance of the first sealed cavity 21, effectively reducing the resonance frequency of the acoustic device, and improving the low-frequency sensitivity.

In the prior art 1, the compliance of the acoustic device is composed of the compliance of the sound generating unit and the compliance of the sealed cavity in the housing in parallel. The formula $f_s$ in the prior art 1 is as follows:

$$f_s = \frac{1}{2*\pi}\sqrt{\frac{C_{as}+C_{ab}}{C_{as}*C_{ab}*M_{ac}}}$$

wherein $f_s$: the resonance frequency of the acoustic device; Cas: the equivalent acoustic compliance of the sound generating unit; Cab: the equivalent acoustic compliance of the air in the housing; Mac: the equivalent sound quality of the vibrating system of the sound generating unit.

Figure 2:
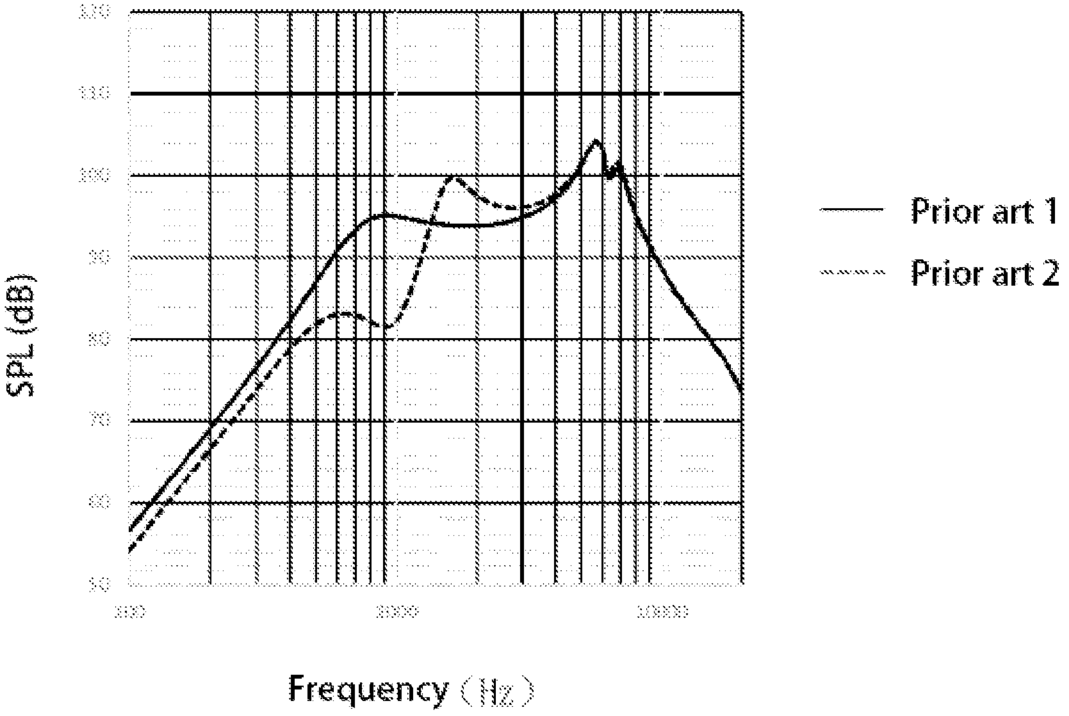
FIG. 2 shows the test curves of loudness (SPL curves) at different frequencies for the acoustic device provided with the passive radiator in the prior art 2 and the acoustic device with a traditional structure in the prior art 1.
Figure 5:
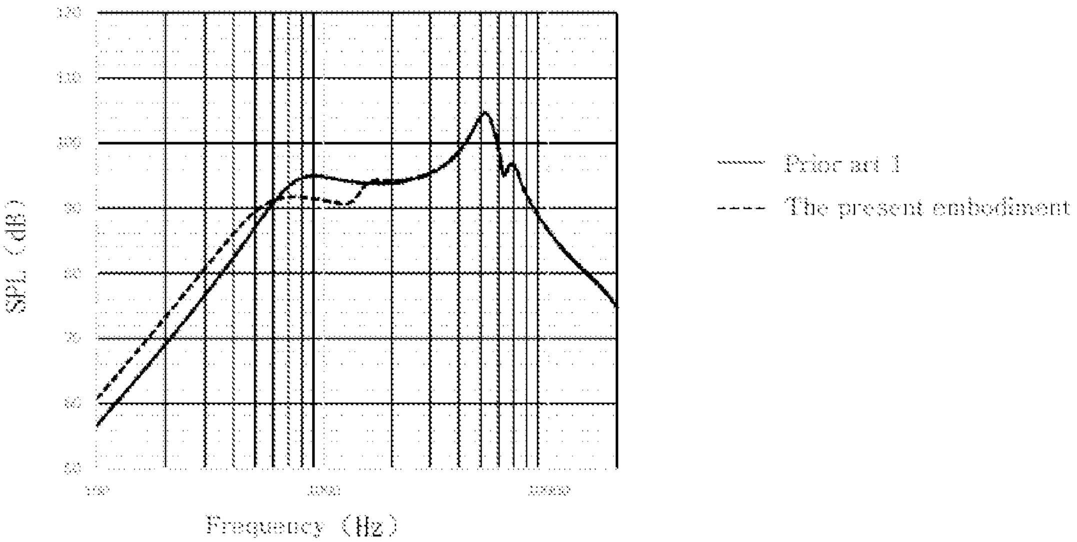
FIG. 5 shows the test curves of loudness (SPL curves) at different frequencies for the acoustic device according to one embodiment of the present invention and the acoustic device with the traditional structure in the prior art 1.

In the prior art 2 and this embodiment, as shown in FIG. 2 and FIG. 5, FIG. 2 shows the test curves of loudness (SPL curves) at different frequencies for the acoustic device provided with the passive radiator in the prior art 2 and the acoustic device with a traditional structure in the prior art 1, FIG. 5 shows the test curves of loudness (SPL curves) at different frequencies for the acoustic device according to this embodiment and the acoustic device in the prior art 1, and the final equivalent compliance increases because the sound generating unit is further connected with the compliance of a passive radiator/flexible deformation part 22 in parallel, therefore FO decreases. The formula $f_s$ in the prior art 2 and this embodiment is as follows:

$$f_s = \frac{1}{2*\pi}\sqrt{\frac{C_{as}+C_{ab}+C_{ap}}{C_{as}*C_{ab}*C_{ap}*M_{ac}}}$$

wherein fs: the resonance frequency of the acoustic device; Cas: the equivalent acoustic compliance of the sound generating unit; Cab: the equivalent acoustic compliance of the air in the first sealed cavity; Mac: the equivalent sound quality of the vibrating system of the sound generating unit; Cap: the equivalent acoustic compliance of the passive radiator/flexible deformation part.

Moreover, in the prior art 2, the sound generating unit and the passive radiator radiate sound at the same time, the phases of the sound waves of the sound generating unit and the passive radiator are opposite to each other at the frequency below the resonance point fp, and the sound pressures of the sound generating unit and the passive radiator offset with each other, the passive radiator has a negative effect on the sensitivity of the acoustic system.

Figure 6:
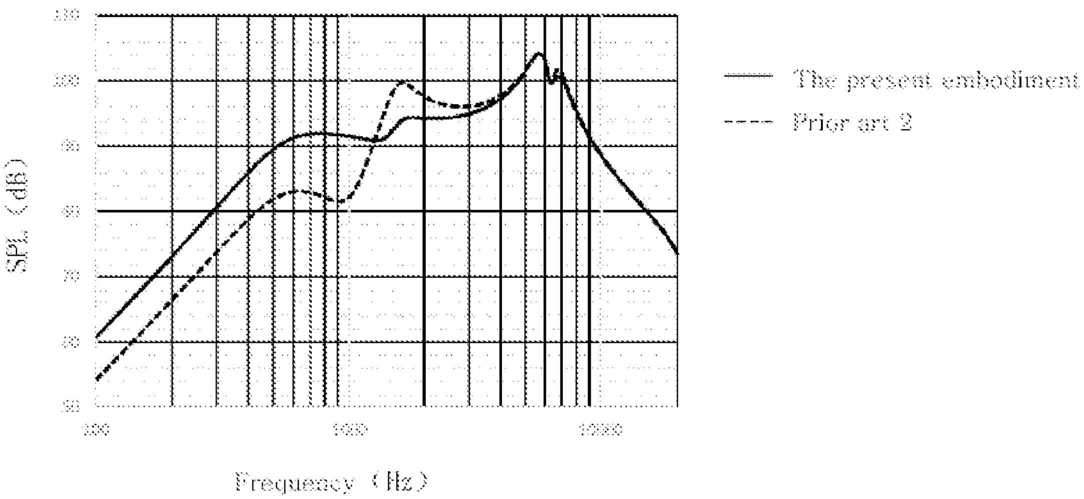
FIG. 6 shows the test curves of loudness (SPL curves) at different frequencies for the acoustic device according to an embodiment of the present invention and the acoustic device provided with the passive radiator in the prior art 2.

Further, in this embodiment, as shown in FIG. 6, FIG. 6 shows the test curves of loudness (SPL curves) at different frequencies for the acoustic device according to this embodiment and the acoustic device provided with the passive radiator in the prior art 2. By providing the closed second sealed cavity 31, the second sealed cavity 31 retains the sound wave generated at the rear side of the diaphragm sheet of the acoustic device in the interior of the acoustic device. Specifically, the sound pressure generated by the flexible deformation part 22 is isolated by the second sealed cavity 31, so as to avoid the offset effect on the forward radiated sound wave of the sound generating unit due to the anti-phase radiated sound wave generated by the deformation of the flexible deformation part 22, and thus the low-frequency sensitivity of the product is greatly improved as a whole.

Embodiment 2

Figure 7:
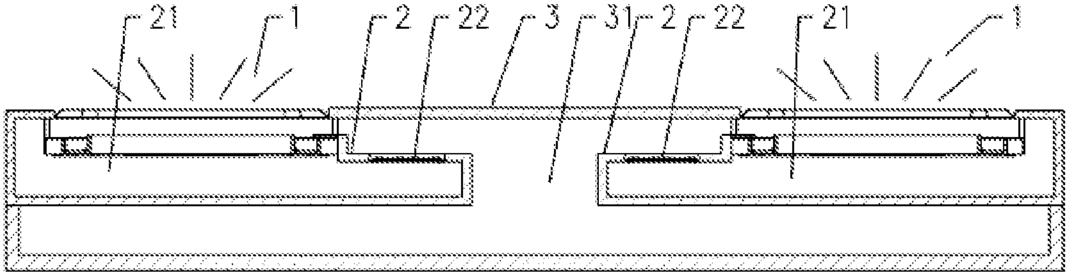
FIG. 7 is a schematic diagram of the structure of the acoustic device according to another embodiment of the present invention.

The main difference between this embodiment and the above embodiment is that: in this embodiment, a plurality of sound generating units 1 and a plurality of first sealed cavities 21 are provided in a one-to-one correspondence, one second sealed cavity 31 is provided, and the cavity wall of each of the first sealed cavities 21 is provided with one flexible deformation part 22. Specifically, as shown in FIG. 7, the acoustic device in this embodiment comprises two sound generating units 1, in the meanwhile, two first sealed cavities 21 are provided and designed correspondingly, one second sealed cavity 31 is provided, and the cavity wall of each of the two first sealed cavities 21 is provided and designed with a flexible deformation part 22. This design can facilitate the application in the case of acoustic devices or systems requiring a plurality of sound generating units 1, for example, the design requirements of stereo or array form. The number of the first sealed cavities in this embodiment may also be other numbers, and the first sealed cavities form a sealed cavity together with one second sealed cavity.

Embodiment 3

This embodiment discloses an electronic apparatus 5, as shown in FIG. 8 and FIG. 9, the acoustic device in the above embodiments is mounted on the electronic apparatus 5. The electronic apparatus 5 may be a mobile phone, tablet computer, notebook computer, etc.

The electronic apparatus 5 specifically comprises a housing of the electronic apparatus, and at least a part of the housing of the electronic apparatus is used to form the first sealed cavity 21 and/or the second sealed cavity 31 of the acoustic device. That is, part or entire of the cavity walls of the first sealed cavity 21 are composed of the housing of the electronic apparatus, or part or entire of the cavity walls of the second sealed cavity 31 are composed of the housing of the electronic apparatus, or part or entire of the cavity walls of the first sealed cavity 21 and the second sealed cavity 31 are composed of the housing of the electronic apparatus. In the present invention, the housing of the electronic apparatus is also used as the cavity wall of the first sealed cavity 21 and/or the second sealed cavity 31, which can make full use of the space inside the electronic apparatus, save a part of the space occupied by the cavity wall, and is more beneficial to the thin design of the electronic apparatus.

In this specific embodiment, the acoustic device comprises a first housing 2, the sound generating unit 1 is mounted on the first housing 2 to form a sound generating assembly, the first sealed cavity 21 is formed between the vibrating diaphragm 11 of the sound generating unit 1 and the first housing 2, the mounting hole is provided on the first housing 2, and the flexible deformation part 22 is provided at the mounting hole, the number of mounting holes and flexible deformation parts 22 are not limited to one group, and a plurality of groups of mounting holes and flexible deformation parts may be provided at different positions of the first housing 2. The acoustic device further comprises a second housing 3, the sound generating assembly is mounted in the second housing 3, and the second sealed cavity 31 is formed between the second housing 3 and the first housing 1. Here, the second housing 3 is the housing of the electronic apparatus. In fact, the space between the housing of the electronic apparatus and the internal components as well as the space between the housing of the electronic apparatus and the first housing 2 of the acoustic device form the second sealed cavity 31. The housing of the electronic apparatus also serves as the second housing 3 of the acoustic device, so that the second housing of the acoustic device itself is omitted, and the gap space between the housing of the electronic apparatus and the components is fully utilized, therefore the maximum design of the second sealed cavity 31 can be realized, which is beneficial to the thin design of electronic apparatus.

Although some specific embodiments of the present invention have been described in detail by examples, those skilled in the art should understand that the above examples are only for illustration, not to limit the scope of the present invention. Those skilled in the art should understand that the above embodiments may be modified without departing from the scope and spirit of the present invention. The scope of the present invention is defined by the appended claims.

The invention claimed is:

1. An acoustic device, comprising a sound generating unit, the sound generating unit comprises a vibrating diaphragm, the acoustic device is provided with a sound outlet, and a sound wave at a front side of the vibrating diaphragm radiates to outside through the sound outlet, wherein a first sealed cavity is formed at a rear side of the vibrating diaphragm, a cavity wall of the first sealed cavity is provided with a mounting hole, a flexible deformation part is provided at the mounting hole, a second sealed cavity is provided at an outer side the first sealed cavity, the flexible deformation part is located between the first sealed cavity and the second sealed cavity, and the second sealed cavity seals a sound wave, which is generated by the flexible deformation part during deformation, in the second sealed cavity, and wherein the cavity wall comprises a first wall and a second wall connected with the first wall, the mounting hole is located at the first wall, a recess formed by recessing towards the first sealed cavity is provided at the first wall around the mounting hole, the flexible deformation part is fixed at a bottom of the recess, a through groove formed by recessing towards the first sealed cavity is further provided at the first wall, the through groove passes through the recess and an outer surface of the second wall, and sound wave generated by vibration of the flexible deformation part is transmitted to the second sealed cavity through the through groove, wherein the acoustic device comprises a first housing, the sound generating unit is mounted on the first housing to form a sound generating assembly, the first sealed cavity is formed between the vibrating diaphragm of the sound generating unit and the first housing, the first housing is provided with the mounting hole, and the flexible deformation part is provided at the mounting hole, and wherein the acoustic device comprises a second housing, the sound generating assembly is mounted in the second housing, the second sealed cavity is formed between the second housing and the first housing, and the second housing is a housing of an electronic apparatus, wherein the sound outlet is provided at a side wall of the second housing, and the side wall extends in a vertical direction, wherein the second sealed cavity isolates sound radiation generated by the flexible deformation part during the deformation, and encloses radiated sound wave of the flexible deformation part in the acoustic device, to avoid offset effect on forward radiated sound wave of the sound generating unit due to anti-phase radiated sound wave of the flexible deformation part, and wherein the sound generating unit is not overlapped with the flexible deformation part and the sound outlet in the vertical direction.

2. The acoustic device according to claim 1, wherein the flexible deformation part comprises a body part, and the body part has a flat plate structure, or at least an edge portion of the body part is provided with a protrusion, or at least an edge portion of the body part has a wavy structure.

3. The acoustic device according to claim 2, wherein the edge portion of the body part is provided with one protrusion, and the protrusion protrudes from the first sealed cavity towards the second sealed cavity, or the protrusion protrudes from the second sealed cavity towards the first sealed cavity.

4. The acoustic device according to claim 2, wherein the flexible deformation part further comprises a composite sheet combined with the body part at a central position of the body part, and the body part has a sheet overall structure or the central position of the body part is hollowed out.

5. The acoustic device according to claim 2, wherein the body part of the flexible deformation part has a single-layer structure, and the single-layer structure is made of one of polymer plastic, thermoplastic elastomer and silicone rubber, or the body part of the flexible deformation part has a multi-layer structure, and at least one layer in the multi-layer structure is made of one of polymer plastic, thermoplastic elastomer and silicone rubber.

6. The acoustic device according to claim 1, wherein a volume of the second sealed cavity is larger than a volume of the first sealed cavity, and at least a portion of the housing of the electronic apparatus for mounting the acoustic device is used to form the first sealed cavity and/or the second sealed cavity.

7. The acoustic device according to claim 1, wherein the first housing comprises a top wall, a bottom wall and a side wall connected between the top wall and the bottom wall, wherein the top wall or the bottom wall is the first wall, and the side wall is the second wall.

8. The acoustic device according to claim 1, wherein the first housing is provided with a plurality of mounting holes, and each of the mounting holes is provided with a flexible deformation part thereon.

9. An electronic apparatus, comprising a housing of the electronic apparatus and the acoustic device according to claim 1.

* * * * *